United States Patent
Deshpande et al.

(10) Patent No.: US 9,772,898 B2
(45) Date of Patent: Sep. 26, 2017

(54) IDENTIFYING ROOT CAUSES OF FAILURES IN A DEPLOYED DISTRIBUTED APPLICATION USING HISTORICAL FINE GRAINED MACHINE STATE DATA

(71) Applicant: International Business Machines Corporation, Armonk, NY (US)

(72) Inventors: Prasad Manikarao Deshpande, Bangalore (IN); Animesh Nandi, Bangalore (IN); Suriya Subramanian, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/852,006

(22) Filed: Sep. 11, 2015

(65) Prior Publication Data
US 2017/0075744 A1   Mar. 16, 2017

(51) Int. Cl.
| | |
|---|---|
| *G06F 11/00* | (2006.01) |
| *G06F 11/07* | (2006.01) |
| *G06F 11/22* | (2006.01) |
| *G06F 11/16* | (2006.01) |
| *G06F 11/30* | (2006.01) |
| *G06F 11/32* | (2006.01) |

(52) U.S. Cl.
CPC ........ *G06F 11/079* (2013.01); *G06F 11/1629* (2013.01); *G06F 11/2268* (2013.01); *G06F 11/3006* (2013.01); *G06F 11/321* (2013.01)

(58) Field of Classification Search
CPC ............... G06F 11/079; G06F 11/1629; G06F 11/2268; G06F 11/3006; G06F 11/321
See application file for complete search history.

(56) References Cited

U.S. PATENT DOCUMENTS

| | | | |
|---|---|---|---|
| 6,651,183 B1 * | 11/2003 | Gensler, Jr. | ......... G06F 11/0709 |
| | | | 714/4.3 |
| 7,877,642 B2 | 1/2011 | Ding et al. | |

(Continued)

OTHER PUBLICATIONS

Chen, Mike Y. et al., "Pinpoint: Problem Determination in Large, Dynamic Internet Services", Proceedings of the International Conference on Dependable Systems and Networks (DSN '02), Jun. 23-26, 2002, Washington, D.C., USA, 11 pages, IEEE Computer Society, Los Alamitos, CA, USA.

(Continued)

*Primary Examiner* — Joshua P Lottich
(74) *Attorney, Agent, or Firm* — Ference & Associates LLC

(57) ABSTRACT

Methods and arrangements for identifying root causes of system failures in a distributed system said method including: utilizing at least one processor to execute computer code that performs the steps of: recording, in a storage device, collected machine state data, wherein the collected machine state data are added to historical machine state data; creating, based on the historical machine state data, a healthy map model; detecting at least one failed machine state in the distributed system; comparing the failed machine state against the healthy map model; identifying, based on the comparison, at least one root cause of the failed machine state; and displaying, on a display device, a ranked list comprising the at least one root cause. Other variants and embodiments are broadly contemplated herein.

20 Claims, 13 Drawing Sheets

(56) References Cited

U.S. PATENT DOCUMENTS

| | | | |
|---|---|---|---|
| 8,001,527 B1* | 8/2011 | Qureshi | G06N 5/048 717/100 |
| 8,015,139 B2 | 9/2011 | Bahl et al. | |
| 8,064,438 B1* | 11/2011 | Croak | H04L 1/24 370/241 |
| 8,495,429 B2 | 7/2013 | Fu et al. | |
| 8,751,867 B2 | 6/2014 | Marvasti et al. | |
| 8,862,727 B2 | 10/2014 | Jayachandran et al. | |
| 8,990,621 B2 | 3/2015 | Gupta et al. | |
| 9,104,572 B1* | 8/2015 | Thompson | G06F 11/079 |
| 9,122,602 B1* | 9/2015 | Jewell | G06F 11/079 |
| 2004/0049565 A1* | 3/2004 | Keller | G06F 11/079 709/223 |
| 2007/0016831 A1* | 1/2007 | Gehman | G06F 11/079 714/43 |
| 2008/0140817 A1 | 6/2008 | Agarwal et al. | |
| 2009/0150131 A1* | 6/2009 | Parthasarathy | G05B 23/0281 703/7 |
| 2011/0154367 A1* | 6/2011 | Gutjahr | G06F 9/542 719/316 |
| 2011/0231704 A1* | 9/2011 | Ge | G06F 11/0709 714/26 |
| 2012/0158925 A1* | 6/2012 | Shen | G06F 11/3476 709/221 |
| 2014/0068326 A1* | 3/2014 | Quinn | G06F 11/0709 714/15 |
| 2014/0136692 A1 | 5/2014 | Tak et al. | |
| 2014/0136896 A1* | 5/2014 | Tak | G06F 11/079 714/26 |
| 2014/0189086 A1* | 7/2014 | Chattopadhyay | H04L 41/145 709/223 |
| 2014/0281739 A1* | 9/2014 | Tuffs | G06F 11/3452 714/47.2 |
| 2016/0124823 A1* | 5/2016 | Ruan | G06F 11/2257 714/26 |

OTHER PUBLICATIONS

Fu, Qiang, et al., "Execution Anomaly Detection in Distributed Systems through Unstructured Log Analysis", The Ninth IEEE International Conference on Data Mining (ICDM 2009), Dec. 6-9, 2009, Miami, FL, USA, 10 pages, IEEE Computer Society Conference Publishing Services, Washington, D.C., USA.

Lerner, Andrew, "The Cost of Downtime", Gartner Blog Network, Jul. 16, 2014, 9 pages, Available at: http://blogs.gartner.com/andrew-lerner/2014/07/16/the-cost-of-downtime/, Accessed on Jul. 30, 2015.

IT Business Edge, "Downtime Report: Top Ten Outages in 2013", IT Business Edge, 5 pages, Available at: http://www.itbusinessedge.com/slideshows/downtime-report-top-ten-outages-in-2013-08.html, Accessed on Jul. 30, 2015.

Amazon, "Summary of the Oct. 22, 2012 AWS Service Event in the US-East Region", Amazon, 8 pages, Available at: http://aws.amazon.com/message/680342/, Accessed on Jul. 30, 2015.

Cockcroft, Adrian, "A Closer Look at the Christmas Eve Outage", Netflix, 7 pages, Available at: http://techblog.netflix.com/2012/12/a-closer-look-at-christmas-eve-outage.html, Accessed on Jul. 30, 2015.

Google, "Today's outage for several Google services", Google, 9 pages, Available at: http://googleblog.blogspot.in/2014/01/todays-outage-for-several-google.html, Accessed on Jul. 30, 2015.

Narasimhan, Priya, "Downtime & Outage Incidents", CMU, 2 pages, Available at: http://www.cs.cmu.edu/~priya/downtime.html, Accessed on Jul. 30, 2015.

Pertet, Soila et al., "Causes of Failure in Web Applications", Parallel Data Laboratory, Carnegie Mellon University, Dec. 2005, 19 pages, Available at: http://www.cs.cmu.edu/~priya/PDL-CMU-05-109.pdf, Accessed on Jul. 30. 2015.

Agarwal, Manoj K., et al., "Problem Determination in Enterprise Middleware Systems using Change Point Correlation of Time Series Data", 10th IEEE/IFIP Network Operations and Management Symposium (NOMS), Apr. 3-7, 2006, Vancouver, BC, pp. 471-482, 12 pages, IEEE Digital Library.

Sharma, Bikash, et al., "CloudPD: Problem Determination and Diagnosis in Shared Dynamic Clouds", DSN 2013, 12 pages, IEEE Digital Library.

Bahl, Paramvir, et al., "Towards Highly Reliable Enterprise Network Services Via Inference of Multi-level Dependencies", SIGCOMM '07, Aug. 27-31, 2007, Kyoto, Japan, 12 pages, ACM Digital Library.

Mysore, Radhika Niranjan, et al., "Gestalt: Fast, Unified Fault Localization for Networked Systems", USENIX ATC '14, 2014 USENIX Annual Technical Conference, Jun. 19-20, 2014, Philadelphia, PA, USA, 14 pages, USENIX, www.usenix.org.

Mann, Vijay, et al., "Correlating user activity with system data for fast detection and diagnosis of system outages", IBM Research Report, Computer Science, RI 11013, Aug. 10, 2011, 12 pages, IBM.

Wang, Yi-Min, et al., "AskStrider: What Has Changed on My Machine Lately?", Technical Report, MSR-TR-2004-03, Jan. 5, 2004, 13 pages, Microsoft Research, Microsoft Corporation, Redmond, WA, USA.

\* cited by examiner

```
"namespace": "irlbxvm015",           310
"crawltime": 1394012691,              320
"featuretype": "os",                  330
"featurekey": "os::linux",
"osname": "Ubuntu-12.04-precise",
"osdistro": "Ubuntu",
"ipaddr": "9.109.124.84",
"ostype": "linux",
"osplatform": "x86_64",
"osrelease": "3.2.0-29-generic",
"osversion": "#46-Ubuntu SMP Fri Jul 27
17:03:23 UTC 2012",
"boottime": "2014-02-26T02:02:00Z"
```

```
"namespace": "irlbxvm015",
"crawltime": 1394012691,
"featuretype": "disk",
"featurekey": "disk::/",
"mountpt": "/",
"fstype": "ext4",
"freepct": 70.4,
"partitionsize": 102915182592,
"mountopts": "rw,errors=remount-ro",
"partitionname": "/dev/sda1"
```

```
"namespace": "irlbxvm015",
"crawltime": 1394012691,
"featuretype": "config",
"featurekey": "config::/etc/passwd",
"content": "...",
"name": "passwd",
"path": "/etc/passwd",
"internal_path": "/etc/passwd"
```

```
"namespace": "irlbxvm015",
"crawltime": 1394012691,
"featuretype": "package",
"featurekey": "package::accountsservice",
"pkgsize": "316",
"pkgversion": "0.6.15-2ubuntu9.7",
"pkgname": "accountsservice"
```

```
"namespace": "irlbxvm015",
"crawltime": 1394012691,
"featuretype": "connection",
"featurekey":
"connection::20878/9.109.124.84/44946",
"connstatus": "ESTABLISHED",
"remoteipaddr": "9.122.78.82",
"pname": "ssh",
"remoteport": 22,
"pid": 20878,
"localipaddr": "9.109.124.84",
"localport": 44946
```

```
"namespace": "irlbxvm015",
"crawltime": 1394012691,
"featuretype": "process",
"featurekey": "process::python/32235",
"cmd": "python -m SimpleHTTPServer",
"ppid": 32057,
"created": "2014-03-05T14:14:00Z",
"openfiles": [ ... ],
"pname": "python",
"pid": 32235,
"cwd": "/home/guest/",
"user": "guest"
```
340

FIG. 3

Categorization of entities based on a graph-diff over a problematic time-interval [t_good, t_bad]

| Category | Newly Observed | Disappeared Now | Changed in value | No change |
|---|---|---|---|---|
| file | 425 | 30 | 35 | 207623 |
| disk | 0 | 0 | 1 | 9 |
| config | 1 | 2 | 1 | 3880 |
| process | 3 | 2 | 2 | 5680 |
| package | 2 | 1 | 1 | 8062 |
| os | 0 | 0 | 0 | 4 |
| Total | 431 | 35 | 40 | 225,258 |

FIG. 8

Assignment of seed-anomaly scores to different categories corresponding to entities that changed in the problematic time-window

Seed-Anomaly score Assignment for entity Category='Newly_Observed' — 910

Scoring Algorithm:

1. If (entity observed at some point in the past):
   Then:
       use value-histogram based score
   Else:
       use default high score

---

Seed-Anomaly score Assignment for entity Category='Disappeared_Now' — 920

Scoring Algorithm:

1. Compare with historic existence profile
2. Define
   1. Disappearance-duration = d_observed
   2. Avgerage historic disappearance-duration = d_historic_avg
   3. StdDev of historic disappearance duration = d_historic_stddev
3. Then Score is proportional to $((d\_observed - d\_historic\_avg) / d\_historic\_stddev)$

---

Seed-Anomaly score Assignment for entity Category='Changed_In_Value' — 930

Scoring Algorithm:

1. Compare with historic value-histogram on a per-attribute basis
2. Divergence score of an attribute is inversely proportional to healthy-state occurrence probability.
3. Use maximum of the divergence score of any attribute.

FIG. 9

Example of seed-score getting strengthened

1. Fault scenario: some fault on the SAN disk affects all disk I/O heavy process entities reading from it 2. Since all processes point to SAN-disk, the score of SAN-disk is strengthened via propagation of anomaly scores from all the anomalous processes along edges

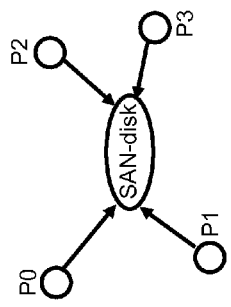

FIG. 10A

Example of seed-score getting weakened

1. Fault Scenario: an application process P0 suddenly behaving erroneously, is talking to two processes P1 and P2 remotely. Only one of them happens to the root-cause of problem.

2. The vicinity around the two processes P1/P2 reveals that entities P3/P4 that depend on P1 are actually behaving fine, whereas there is one entity P5 that depends on P2 which is also misbehaving. The fact that the nodes dependent on P1 are fine, the score of P1 gets weakened relative to P2.

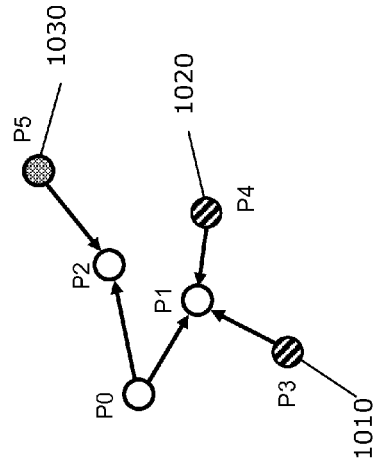

FIG. 10B

| Data Type | Description of data | Manual Drill Down Approach | Manual Time Spent | Granularity |
|---|---|---|---|---|
| METRIC DATA | Metrics emitted from different Micro-services | Inspects a health-check dashboard | Low | Identifies faulty micro-service |
| LOG DATA | Logs from different sub-modules of each Micro-service | Inspects errors and warning messages in logs | Medium | Identifies faulty sub-module of the faulty micro-service |
| FINE GRAINED MACHINE STATE DATA | Fine-grained machine entity data from different sub-modules of each Micro-service | Inspects numerous machine entities and identifies root-cause | High | Identifies faulty machine entity as culprit |

FIG. 12

IDENTIFYING ROOT CAUSES OF FAILURES IN A DEPLOYED DISTRIBUTED APPLICATION USING HISTORICAL FINE GRAINED MACHINE STATE DATA

BACKGROUND

Most enterprises resort to hosting their applications on a co-located or cloud datacenter. Typically, these applications are complex distributed applications that in addition to comprising multiple components (e.g., modules or microservices) may require complex interactions between the different components. Furthermore, these applications may rely on specific infrastructure and middleware components provided by the cloud provider itself. It is vital to business operations that these cloud hosted distributed applications are constantly available, because the cost of downtime can be significant. It is not hyperbole to state that a single hour of downtime can cost a business retailer tens of thousands of dollars.

Downtime does not only affect revenue generation lost, in fact the true cost of downtime can be much higher. The true cost can include, for example, lost or dissatisfied customers, damage to a company's reputation, lost employee productivity, and even devaluation of the business (e.g., falling stock prices). A large number of non-malicious failures occur during routine maintenance (e.g., uninterruptable power supply (UPS) replacement, failure of a machine hard disk, adding of new machines or deprecating old machines from the cluster).

BRIEF SUMMARY

In summary, one aspect of the invention provides a method of identifying root causes of system failures in a distributed system said method comprising: utilizing at least one processor to execute computer code that performs the steps of: recording, in a storage device, collected machine state data, wherein the collected machine state data are added to historical machine state data; creating, based on the historical machine state data, a healthy map model; detecting at least one failed machine state in the distributed system; comparing the failed machine state against the healthy map model; identifying, based on the comparison, at least one root cause of the failed machine state; and displaying, on a display device, a ranked list comprising the at least one root cause.

Another aspect of the of the invention provides an apparatus for identifying root causes of system failures in a distributed system apparatus comprising: at least one processor; and a computer readable storage medium having computer readable program code embodied therewith and executable by the at least one processor, the computer readable program code comprising: computer readable program code that records, in a storage device, collected machine state data, wherein the collected machine state data are added to historical machine state data; computer readable program code that creates, based on the historical machine state data, a healthy map model; computer readable program code that detects at least one failed machine state in the distributed system; computer readable program code that compares the failed machine state against the healthy map model; computer readable program code that identifies, based on the comparison, at least one root cause of the failed machine state; and computer readable program code that displays, on a display device, a ranked list comprising the at least one root cause.

An additional aspect of the invention provides a computer program product for identifying root causes of system failures in a distributed system, said computer program product comprising: a computer readable storage medium having computer readable program code embodied therewith, the computer readable program code comprising: computer readable program code that records, in a storage device, collected machine state data, wherein the collected machine state data are added to historical machine state data; computer readable program code that creates, based on the historical machine state data, a healthy map model; computer readable program code that detects at least one failed machine state in the distributed system; computer readable program code that compares the failed machine state against the healthy map model; computer readable program code that identifies, based on the comparison, at least one root cause of the failed machine state; and computer readable program code that displays, on a display device, a ranked list comprising the at least one root cause.

A further aspect of the invention provides a method comprising: recording, in a storage device, collected machine state data, wherein the collected machine state data are added to historical machine state data; creating, based on the historical machine state data, a healthy map model; detecting at least one failed machine state in the distributed system; determining a failure time, wherein the failure time is associated with the at least one machine state failure; determining a healthy time, wherein the healthy time is associated with a healthy state of the machine state and its dependencies prior to the failure time; generating at least one seed-anomaly score, using an inference algorithm, for machine states between the healthy time and the failure time; and modifying the at least one seed-anomaly score, based on an iterative graph convergence algorithm; wherein the ranked list is based on the modified at least one seed-anomaly score.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 3 illustrates an example of key value based machine state data an embodiment may collect.

FIG. 8 illustrates a categorization table of entities within a problematic time interval.

FIG. 9 illustrates an example scoring algorithm for a seed-anomaly score.

FIG. 10A illustrates an example of seed score strengthening.

FIG. 10B illustrates an example of seed score weakening.

FIG. 12 illustrates an example embodiment of identifying root causes of failures in a deployed distributed application using historical fine grained machine state data.

DETAILED DESCRIPTION

Figure 1:
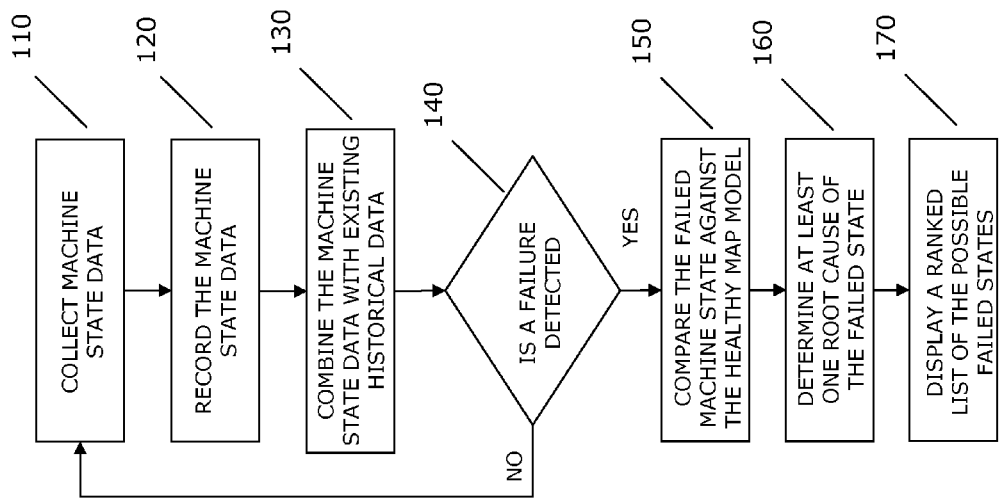
FIG. 1 illustrates an example embodiment of identifying a root cause of a failure in a distributed system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

In large networked distributed system (e.g., cloud-hosted distributed application running in a shared datacenter) it is typical for resources to be shared and utilized by a large number of varying application systems. Because so many of the resources or entities within a networked distributed application system are dependent on each other, the failure of a single entity can cause a cascading failure throughout the system. Thus, when a single system or multiple systems fail it can be difficult to determine what particular resources are at fault. Further, since the distributed application has so many dependent resources, diagnosing which one is the root cause of the problem can be very challenging. Therefore it is vital that these systems be monitored and maintained to ensure that when a fault occurs, the root cause of the fault can be determined quickly so as to ensure the highest possible uptime.

However, due to the scale and complexity of current networked distributed systems, one of the major problems faced by system administrators is the diagnosis and identification of the root cause of a failure of a distributed application (e.g., a deployed cloud application) within the interconnected network. It can be particularly difficult, when a fault is observed in a distributed application that is running (e.g., a currently active application).

In order to assist the Information Technology (IT) administrators (subject matter experts) in the root cause analysis process, tools have been developed to reduce the amount of manual effort spent on the identification process. However, conventional tools simply analyze metric and log data, and thus are unable to pinpoint the precise root cause of the problem. This is due to the inherent nature of metric and log data itself.

Thus, due to the short comings of current solutions, IT administrators are required to remotely log into particular machines manually and run tests on the faulty components while analyzing a large volume of fine grained machine state entities (e.g., processes, configuration files, packages, connections, mounted disk partitions, file system metadata, etc.) that may be related to the observed issues (e.g., SLA violations) in the metrics and/or the messages in the error log.

In problem diagnosis, speed matters; thus there is a need for techniques that allow for enhanced automation via fine grained root cause identification. Problem diagnosis of distributed systems is challenging for various reasons, for example, the increasing number of participating distributed components within a typical application, or the large variety of potential causes for failed applications. Further examples include but are not limited to: application and deployment misconfigurations; application code related errors or performance bugs; a change to dependent packages/shared libraries; issues with hosted infrastructure (e.g., shared resource contention); and the like.

As of today, there exists no tool to automatically analyze fine grained machine state data and identify the root cause, resulting in IT administrators spending an inordinately large amount of time manually analyzing the huge volume of fine grained machine state entities that might be related to the fault.

As a result of this approach, current solutions for root cause diagnosis still require large amounts of time and energy from a subject matter expert to fully (i.e., pinpoint at a fine grained level) identify the actual root cause. This required manual inspection of potential causes by a subject matter expert is time and cost intensive. Thus, a solution is needed that can automate the identification process and do so at a granular level to specifically identify the root cause.

However, although fine grained machine state data offer immense potential to help fully identify the root cause or pinpoint the root cause at a fine grained level, building a solution that allows for automation of the process creates a technical challenge in that operating on fine grained machine state data is many orders of magnitude more challenging than what is available in current solutions (e.g., those that analyze metric or log data). This is because the number of fine grained machine state entities is so much higher than the number of collected metrics and log files currently analyzed.

Furthermore, the technical problem is not only of tackling the scale and volume of fine grained machine entities, but also devising new techniques that can operate on fine grained machine entities. For instance, the techniques used to analyze metric data (e.g., tracking the average of numeric metric and reporting alerts based on significant deviations from average) does not apply to machine entities. Similarly, the techniques used for analyzing log data (e.g., searching for loglines that report errors or warning messages) fail to account for machine entities.

Therefore, an embodiment, allows for root cause identification to be automated. This is enabled through periodically collecting very fine grained machine state data of various types (e.g., processes, connections, configuration settings, packages, application metrics, attributes of shared infrastructure (e.g., disk, central processing unit (CPU), memory, etc.)). This machine state data is then used to discover application invariants on the machine state (e.g., a list of typical processes the current application starts, a list of typical remote connection ports, a list of typical shared libraries accessed, a list of configuration files read, etc.). An invariant is a condition that can be relied upon to be true during execution of a program, or during some portion of it. It is a logical assertion that is held to always be true during a certain phase of execution. Then, based on the collected information, correlations are generated across anomalies (i.e., deviation of a faulty state from the invariants) of various types of machine state data related to running applications. An embodiment may then take the discovered correlations and identify possible root causes of a fault.

In another embodiment, fine grain machine state data (e.g., processes, configuration files, installed packages, metrics, infrastructure shared resource utilization, etc.) is periodically collected and analyzed from physical machines and/or virtual machines (VMs) on which the distributed application is deployed. This periodic collection directly from running applications when an entire system is healthy allows an embodiment to construct a healthy reference model. This healthy reference model captures application invariants over a variety of machine states. When an application fault is observed, an embodiment compares the recent machine state data collected from the failed application against the application's healthy reference model (i.e., typical invariants). Based on the difference between the healthy reference model and the faulty state, an embodiment may identify potential root causes for the observed fault. The embodiment then utilizes a root cause inference algorithm that is able to pinpoint the root cause and/or return a ranked list of potential root causes with the most likely or relevant cause being given high rank. The inference algorithm calculates the divergence score of the entity's state at the time of fault as compared to the healthy state model of that entity.

An even further embodiment may include a training phase, which is executed during the operation of a healthy system. Initially, an embodiment may periodically collect fine grained machine data. Once the data collected, an embodiment may represent the collected data in a temporally evolving property graph model. Based on this temporally evolving property graph, a healthy profile is built on a per entity basis from the time series of evolution of the entity's state.

An embodiment may then include a root cause diagnosis phase, which is executed when a predetermined trigger occurs (e.g., getting a service level agreement (SLA) violation, receiving a ticket, etc.). The root cause diagnosis phase may first determine the problematic time interval [t_good, t_bad] using the metrics and dependency edges. A graph-diff (difference determining graph) is then created based on the g(t_bad) and g(t_good) to identify the set of potentially anomalous entities. Once the graph is created, an embodiment will assign a seed-anomaly score to each potentially anomalous entity based on their divergence from the healthy state model. An embodiment may then use dependency edges to strengthen or weaken the seed-anomaly scores, using the various methods described herein, to create a ranked list of root causes. Once the ranked list exists, it may be displayed in a faceted manner with additional navigation options.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to the figures. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 13. In accordance with an exemplary embodiment, most if not all of the process steps, components and outputs discussed with respect to FIG. 1 can be performed or utilized by way of a processing unit or units and system memory such as those indicated, respectively, at 16' and 28' in FIG. 13, whether on a server computer, a client computer, a node computer in a distributed network, or any combination thereof.

Broadly contemplated herein, in accordance with at least one embodiment of the invention are methods and arrangements which involve collecting fine grain machine state data and converting that data into a property graph model. An embodiment may then, based upon the property graph representation, construct a healthy state reference model. An embodiment then calculates the divergence (i.e., difference) between a detected fault state and the known healthy state model. Additionally, an embodiment utilizes a root cause inference algorithm to exploit specific property graph based modeling techniques as used herein. The embodiment then maps or converts multi-silo machine state data into a key value based property graph, wherein different machine state features are nodes/vertices of the graph. The terms node and vertex are used interchangeably throughout this disclosure when in reference to graph generation. Furthermore, each node additionally has a property or attribute list in the form of key value pairs.

Referring now to FIG. 1 which schematically illustrates a system architecture, in accordance with at least one embodiment of the invention. At 110, an embodiment may collect machine state data. The machine state data may be collected through a variety of methods. For example, an embodiment may utilize a crawler which systematically browses (i.e., crawls) through the integrated system and records information at various states and times. The crawler then indexes content within the system as it crawls. In addition, the crawler has the ability to recognize certain characteristics of the system (e.g., particular dependencies, communication between entities, certain code operators, etc.).

Additionally or alternatively, the data may be collected via manual entry of a user (e.g., a user may enter specific components and their exiting dependences). An embodiment may also collect machine state data from multiple silos of data, for example, metrics, configuration files, files, processes, packages, connections, development operations, tickets submitted indicating potential changes or updates, known events detected, logs, administrative operations, etc.

Figure 2:
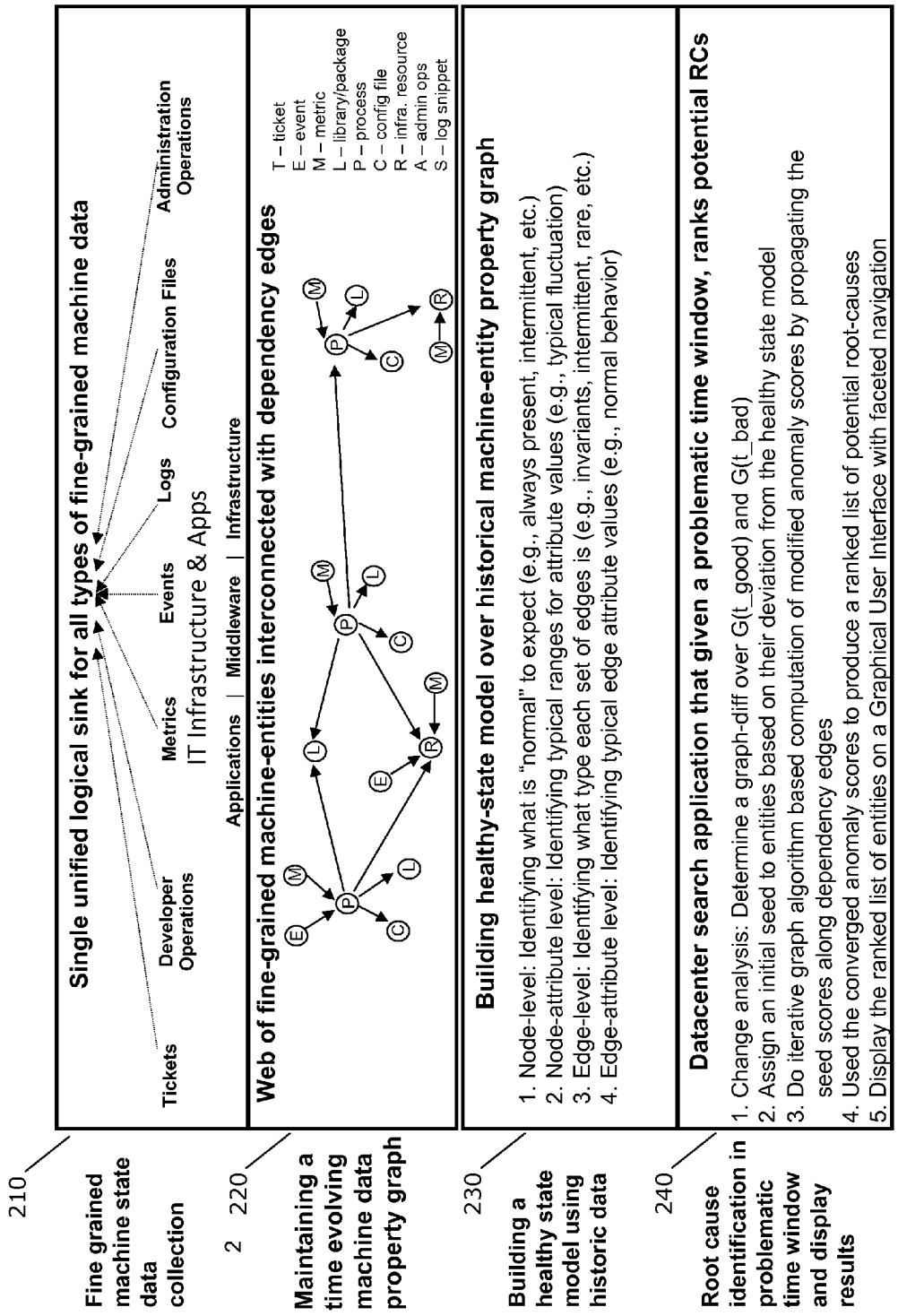
FIG. 2 illustrates another example embodiment of identifying a root cause of a failure in a distributed system.

A further example embodiment is shown in FIG. 2 at 210. An embodiment may, during the fine grained machine state data collection, draw from multiple sources. For example, and as shown in 210, work ticket requests, developer operations, standard metrics, infrastructure events, data logs, configuration files, administration operations, and the like can be used for data collection. The fine grain data may be collected from various levels within the distributed system (e.g., application, middleware, infrastructure, etc.).

Application metrics may be for example infrastructure incidents, infrastructure availability, infrastructure utilization and performance, application issues, application availability, application utilization and performance, operations, application support, etc. Collecting data related to the configuration files may help detect changes to the configuration files themselves (e.g., change of remote port, thread pool size, etc.). Collecting data related to the processes may help detect processes that have crashed or even new resource heavy process that may have been created. Collecting data related to the packages may help detect changes to typical opened files (e.g., a change to a new version of a shared library due to package upgrades). Collecting data related to the connections may help detect missing network connections to remote topology nodes of the same application. Collecting data related to the development operations may be used to detect recent changes to code deployment data.

Referring briefly to FIG. 3, additional examples and explanations regarding machine state data that is collected is shown. For example, at 310 a "namespace" is determined, wherein a namespace may be a tag that is associated by the crawler to represent the source of the data. For example, namespaces may be the machine name, or a representation of the machine (e.g., <machine-name, application-component>), or even simply the application and component name if only one such component exists in the application cluster.

Further, as discussed herein, an embodiment may assign a "featuretype" at 330 to uniquely represent each fine grained machine entity collected on a particular namespace. Thus, the <namespace:featuretype>tuple may be used to uniquely identify the different fine grained machine entities collected by the system. Moreover, an embodiment may ensure that the featuretype is assigned in a way, such that a featuretype of the same machine entity across a historic timeline is time invariant (e.g., using a name instead of a process ID for processes).

Additionally shown in FIG. 3, an embodiment may record the "crawltime." The crawltime is the recorded time during which the data was collected. This allows an embodiment to associate the recorded data state with a particular reference time. This is important because, as discussed further herein, the machine state data is continuously collected and stored in a historical repository. The repository is then queried when a failure is detected and a time is identified for which the machine state was healthy (e.g., t_good). An embodiment may also record the featuretype as shown at 330 which allows an embodiment to differentiate between the types of entities states being stored (e.g., operating system (OS), disk, configuration file, package, connection, process, etc.).

Referring back to FIG. 1, once the data is collected via any method (e.g., those disclosed herein) it is stored on a storage device (e.g., that shown at 34') at 120. The storage system also houses the historical data states. The historical data states are associated with a known time period during which the state was taken (i.e., a snapshot) as discussed herein. The newly acquired machine state data is then added to the existing historical state data at 130. This is because the machine state data is routinely collected at given intervals, and the historical machine state data is updated based on the continual collecting. For example, a system could use a crawler, like that discussed herein, to constantly crawl through the network system and record data states. Alternatively, an embodiment may only take snapshots once daily, weekly, or monthly depending on the demands of the infrastructure.

Figure 4:
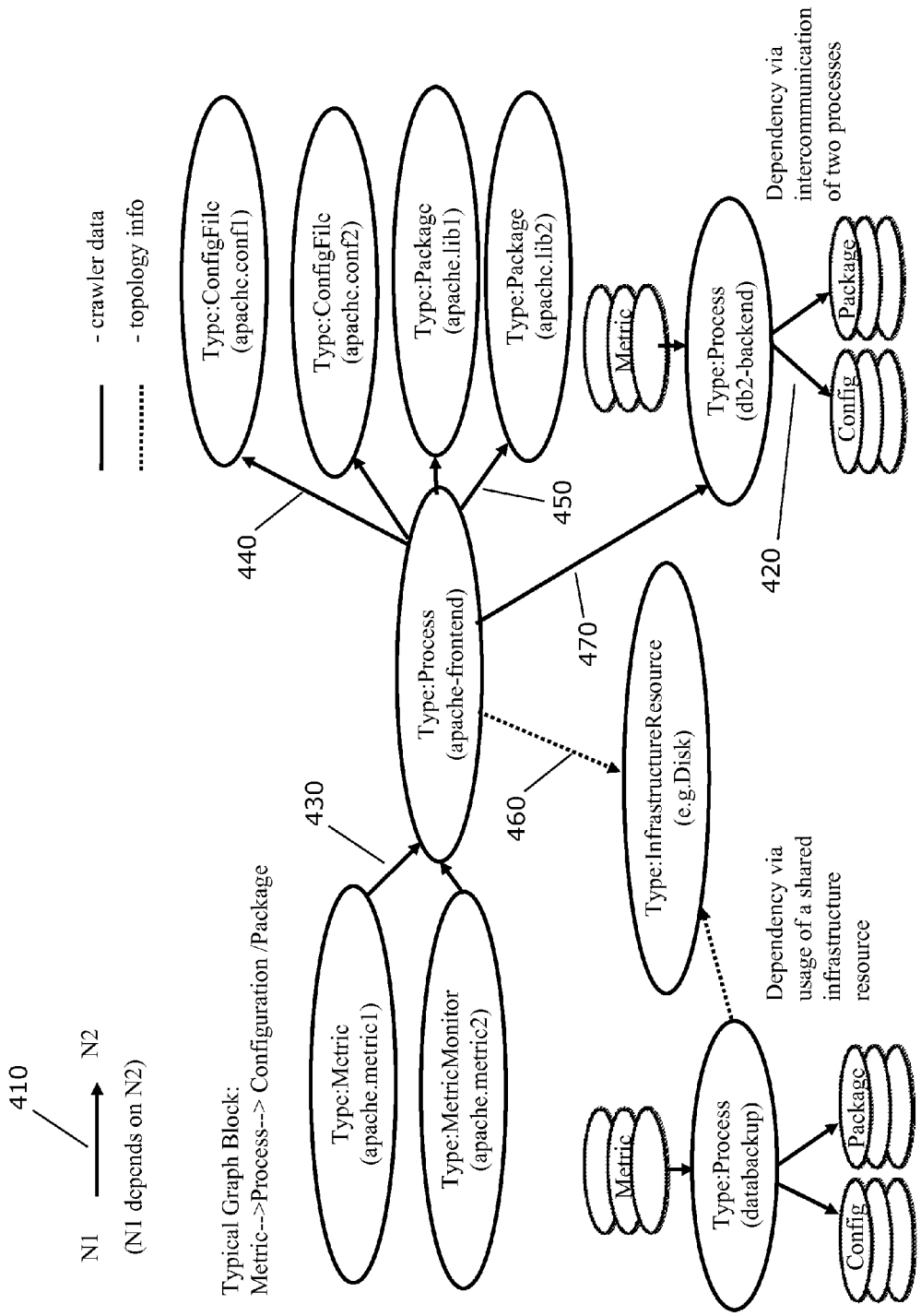
FIG. 4 schematically illustrates an example property graph of a networked distributed system/application.

Based on the acquired historical data, an embodiment creates a time evolving property graph representation. Brief reference will now be made to FIG. 4. An embodiment may, as shown in FIG. 4, create a property graph, which links different machine features that have specific dependencies or causal relationships between each other as edges. For example, an edge (i.e., the lines between the nodes) between feature node N1 and N2 at 410 implies that N1 depends on N2. In other words N2 could causally affect N1. Additional examples may be a particular process (i.e., a graph node) having an edge to a configuration file (i.e., another graph node) that it reads such as at 420.

In order to map the collected data snapshot at time (t) into a property graph (e.g., G=(V, E)) an embodiment utilizes vertex modeling and edge modeling. In vertex modeling (V) equals a set of nodes/vertices. Each vertex has a vertex key/id and a set of properties associated with it. An embodiment may convert the collected machine state data into the vertex properties by: (1) flattening hierarchical key space into unique vertex key/id. (e.g., prefix keys by virtual machine name); (2) using intelligent design to ensure the keys are time invariant (e.g., using a name instead of a process ID for processes); and (3) causing the attributes of the features (e.g., the JavaScript Object Notation (JSON) fields) to become properties of the vertex (i.e., list of key/value pairs). An embodiment may create the vertex type annotations based on featuretype. The different classes of vertex annotations (e.g., process, configuration, metric, topology, etc.) may be leveraged to trigger a class/type specific modeling and root cause inference logic.

In an embodiment, the edge modeling (E) comprises a set of edges representing dependencies between vertex keys (e.g., a process reading a configuration file, a file belonging to a particular package, a process opening a connection to a remote port, etc.). The dependency relationships may be of the varying forms. For example, a metric entity may depend on a process entity which is being produced (e.g., 430). Additionally, a process entity may depend on the configuration files from which it reads (e.g., 440). A further example may be a process entity depending on a shared library package entity (e.g., 450). In an even further example, a process may depend on a virtual machine (VM) or machine disk entity on which it runs (e.g., 460), other examples could include CPU entities and memory entities related to the VM. An additional example may be one process entity depending on another remote process entity that it interacts with (i.e., inferring relationships from connections to the different entities) (e.g., 470). An additional example embodiment of a time evolving machine property graph comprising a web of fine grained machine entities interconnected with dependency edges is shown in FIG. 2 at 220.

After mapping the collected machine state data into the property graph representation, an embodiment may construct a healthy state reference model by aggregating multiple property graphs related to different time snapshots of the application when healthy. These snapshots may be annotated and aggregated, with specific techniques based on the node vertex modeling in combination with the edge modeling. One example embodiment, such as that at 230, may create a healthy state model at the node level by identifying what is considered "normal" on particular nodes, and what could be expected based on a particular node (e.g., is the node always present, intermittent, etc.). Additionally, node attributes may be factors (e.g., identifying typical ranges for attribute values and determining how much fluctuation is normal).

Moreover, the vertex is the union of nodes/vertices across different datacenter states at various points in time, wherein each vertex may have various characteristics. One such characteristic is "occurrence-probability," which in addition to the vertex 'key/id' described herein, has an additional "vertexkey_occurence_probability" characteristic created which measures how often a vertex was part of the state snapshot. Another characteristic is "lifespan profile," which relates to the expected duration (and deviation) of an entity remaining in the same state before it is updated. Additionally, a characteristic labeled "attribute value histogram," which is discussed further herein, may be used to enable an embodiment to maintain typical ranges of attribute values (for each attribute) to allow the embodiment to learn what amount of fluctuation is normal.

An embodiment may also use edge level analysis in building the healthy model. For example, identifying which set of edges occur as invariants, which set of edges are intermittent, which set of edges are rare, etc. Similar to the node analysis, attribute level analysis may be used, for example, to determine what typical edge attributes values are normal, or what normal attribute behavior can be expected. Also as above, an embodiment may aggregate the historical information per edge entity into aggregated attributes, for example occurrence probability, lifespan distribution, and attribute value histogram.

Figure 5:
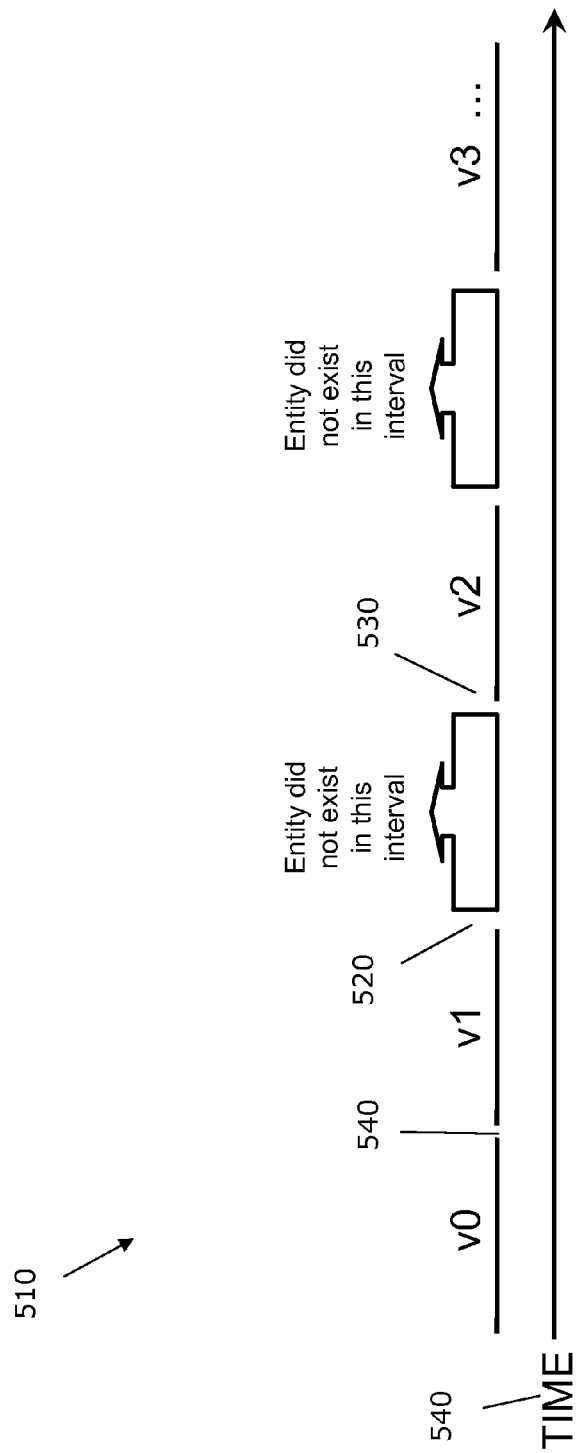
FIG. 5 illustrates the lifespan based profile component of the healthy model, at a per entity level.

Referring now to FIG. 5, an embodiment may create a healthy state model at a per entity level, which allows for tracking the entity via its historic lifespan profile. The time series or lifecycle at 510 of an entity may be represented as a series of its constituent versions. The version of an entity is updated, either when any of the attributes change (540), or it transitions from exiting to non-existing (520), or non-existing to existing (530). Based on the time series of its successive versions, the lifespan of each version can be computed as the time interval [v.b, v.d] wherein "v.b" is the version's birth time and "v.d" is the version's death time. Based the lifespan of each version, the lifespan profile of the entity can be computed to track what the average lifespan is, and also the standard deviation therein.

Further, an embodiment, based on FIG. 5, may compute an average and standard deviation of the contiguous existence (i.e., discounting changes to its attribute values) of an entity during a predetermined time 540. For example, based on FIG. 5, an embodiment would calculate the contiguous existence durations as: [(v1.d−v0.b), (v2.d−v2.b), (v3.d−v3.b)]. A further embodiment may additionally or alternatively calculate the average and standard deviation of non-existing (or disappearance) durations as: [(v2.b−v1.d), (v3.b−v2.d)]. By capturing the lifespan, existence, and non-existence profiles of entities in this manner, an embodiment is able to better summarize and determine whether an entity is always existing, transient in nature, or rarely existing.

Figure 6:
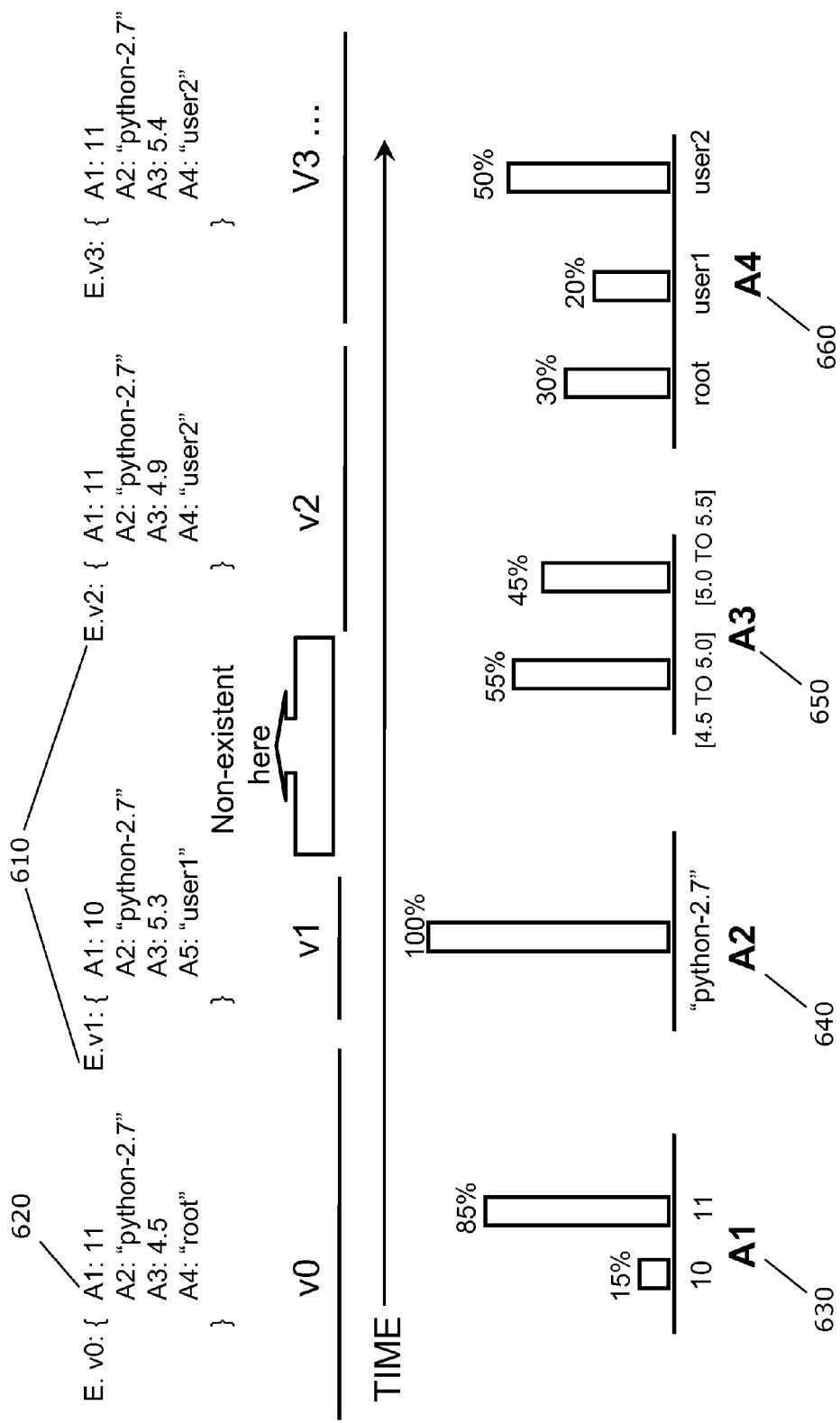
FIG. 6 illustrates the value histogram based profile component of the healthy model, at a per entity level.

Referring now to FIG. 6, another embodiment may, based on the healthy model track the historic profile at a per-entity level for each of its attributes. By way of example, an embodiment may have an entity "E" at 610. As discussed herein, entities (E) may have multiple versions (e.g., E.v1, E.v2, etc.). The entity may also be associated a list of attributes (e.g., A1, A2, A3, A4, etc.) at 620. The attributes correspond to specific factors related to the entity (e.g., attributes for the process entity (340), such as: cmd, threads, pid, openfiles, user, etc. as shown in FIG. 3).

The attributes have the ability to change over time, and thus an embodiment monitors them with regular periodicity as discussed herein. Based on the periodically captured information, a value histogram is calculated for the occurrence probability of each of the attributes at 630-660. Using this histogram, an embodiment may determine if, or which, attributes' value fluctuates. For example, the attribute A2 (640) does not fluctuate at all, whereas attribute A4 (660) fluctuates reasonably. An embodiment may also capture, for a fluctuating attribute, a typical dominating value of the attribute (e.g., A1 observed to have the value '11' with 85% probability). Thus, the value histogram allows an embodiment to determine if the fluctuations are benign or abnormal by observing typical faults.

Referring back to FIG. 1, this continuous machine state capturing, recording, and model creation will continue if no fault is detected at 140. However, when a fault is detected or observed at 140, an embodiment may compare the failed machine state against the created healthy map model at 150. This comparison allows an embodiment to determine a difference between the aggregated and annotated property graphs related to the healthy reference model and the property graph captured at the faulty machine state time.

In an embodiment, a specific instance (e.g., a failure of an application violating an SLA, a user raises a ticket, etc.) triggers a flag observed at a time which an embodiment records as "t_bad." The embodiment will then need to identify a time in the past (e.g., t_good) such that potential root causes of the problem are related to the changes in the time-interval [t_good, t_bad]. In order to accurately identify possible root causes, amongst all possible time intervals, an embodiment needs to minimize the interval [t_good, t_bad] as much as possible, while also ensuring the search is broad enough to capture all potential root causes for the failure of a target application.

One embodiment may receive dependency graph data which is mined from the fine grained machine state data discussed herein. Additionally or alternatively, an embodiment may also receive metric data for all metrics collected from a datacenter (e.g., metrics across all applications, middleware, infrastructure, etc.). Additionally, an embodiment may have an alert threshold, which may be utilized to determine when/if a metric is in a good or bad state. An embodiment may also be able to use algorithms to infer an alert threshold. For example, an embodiment may use a change point detection algorithm, which utilizes the historical value of a metric to detect sudden change points reflecting transitioning to bad state.

Once the above data is received, an embodiment may detect the set of metrics that are attached to any machine entities that are "reachable" from the machine entity (e.g., process) associated with a target application that was observed to fail or misbehave. For example, an embodiment may start at t_bad, and proceed backward in time until all "reachable metrics" (e.g., dependencies) are determined to be in a good state, thus determining a t_good.

Figure 7:
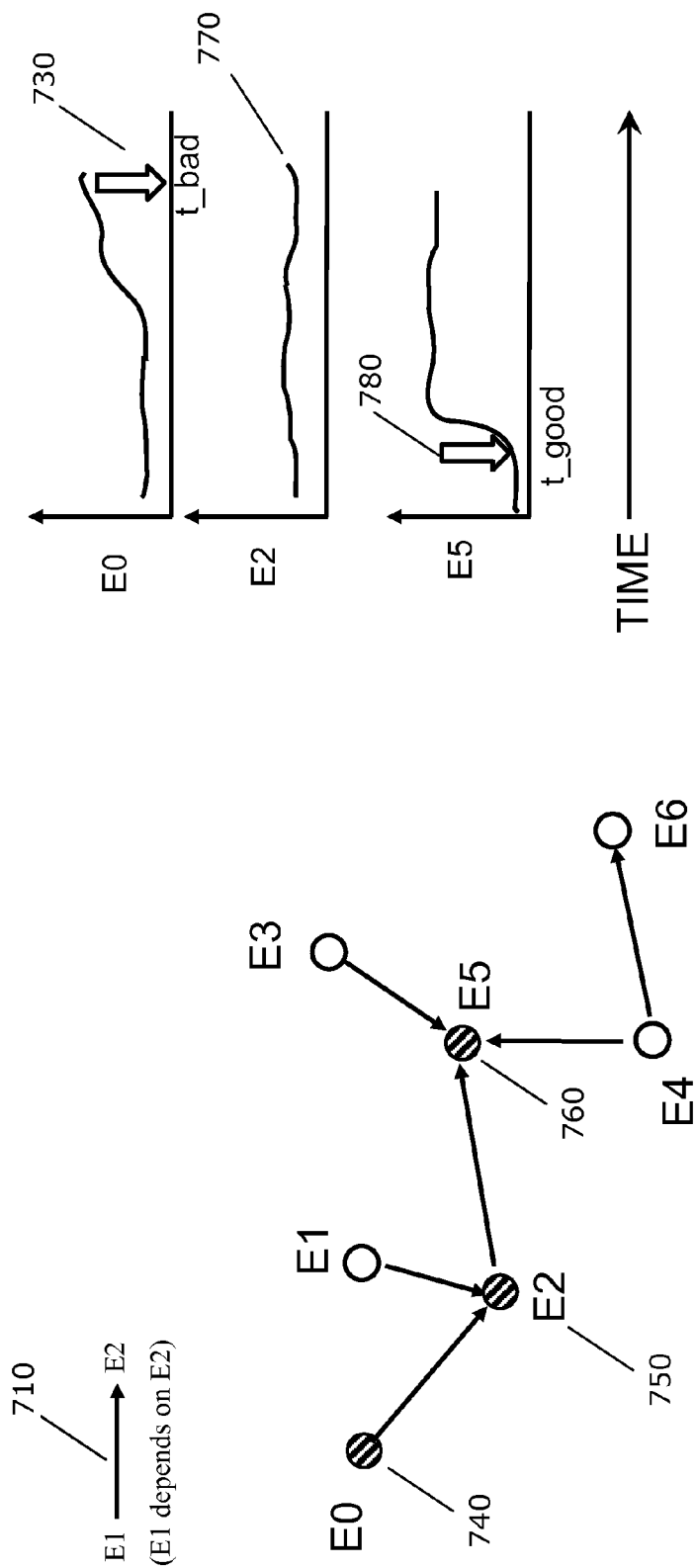
FIG. 7 illustrates a determination of a problematic time interval.

Referring to FIG. 7, an embodiment determines the problematic time interval [t_good, t_bad] using the time services of divergence scores and dependency edges. For example, an embodiment first acquires a set of machine entities that are reachable via dependency edges from the observed faulty entity. Then, based the time series of seed-anomaly scores for each of the reachable entities, an embodiment must determine the nearest time (moving backward in time) from t_bad when all reachable entities have low divergence or anomaly scores. This point in time is then labeled t_good.

By way of specific example, FIG. 7 illustrates a dependency graph. The edge (i.e., the lines between the nodes) between feature node E1 and E2 at 710 implies that E1 depends on E2. In other words E2 could causally affect E1. In an embodiment, a failure is triggered respective to E0 at 730, and thus a time t_bad is identified. Then, based on the dependency graph, an embodiment will trace back all entities that can casually affect E0. By way of example, E0 at 740 is dependent on E2 at 750, which is further dependent on E5 at 760. As shown in the time dependent graph at 770, E2 was never in a failed state. Thus, if E0 was only dependent on E2, t_good would be determined based on a previously functional state of E0 (due to E2 being fully functional at all times). However, because E2 at 750 depends on E5 at 760, E0 depends indirectly on E5. It may also be possible that that a fault at E5 does not directly lead to an observable change in the core functioning of E2 as shown at 771 in the collected operational data related to entity E2. However, the fault did affect a small subset of operations for which E1 is transitively dependent on E5 via E2. Thus the periodic history of E5 is investigated until a time is identified that E5 was in a functional state at 780. This time is thus labeled as t_good, because all causally dependent entities on which E0 is reliant are determined to be in good operational state at that point.

Referring now to FIG. 8, once an embodiment has computed a [t_good, t_bad] problematic time-interval, it may take a "diff" of the property graph between t_good and t_bad to generate at least three classes of entities that could be potential root causes: (1) new entities that were observed in the problematic time-interval but did not exist at t_good (shown in 810), (2) entities that were present at t_good but disappeared/deleted in this problematic time-interval (shown in 820), and (3) entities that were observed before but changed in the value of their attributes (shown in 830). In a further embodiment, a large fraction of entities at 840 remained constant in value throughout the time interval and were essentially pruned out via the graph "diff" operation as being unlikely to be the root cause, as they remained consistent. Thus, an embodiment is more able to identify potential root causes because the number of changes in a problematic time window is much smaller than the total number of entities in an entire data center.

An embodiment may then assign the remaining non-pruned graph nodes and edges weights based on a predetermined algorithm. For example, an embodiment may assign an initial seed-anomaly score to these non-pruned entities using the per-entity healthy state model is shown in FIG. 9. The non-pruned entities typically fall into one of three category types. The first being "Newly_Observed" at 910. As shown in FIG. 9, an example algorithm for a newly observed entity determines if the entity was observed at any point in the past (e.g., outside of the [t_bad, t_good] window). If an embodiment determines that the entity was indeed present at a previous time, the previously calculated value histogram score, discussed herein, is used.

Alternatively, an entity may fall into the "Disappeared_Now" category at 920. Again, as shown in FIG. 9, an example algorithm for a disappeared now entity compares the entity with a historic existence profile and determines a set of variables (e.g., [disappearance_duration], [avg_hist_disappearance_duration], [stddev_hist_disappearance_duration]. etc.), and then calculate the score based on the following equation: ((d_observed−d_historic_avg)/d_historic_stddev).

Finally, an entity may fall into the "Changed_In_Value" category at 930. Once again, as shown in FIG. 9, an example algorithm for a changed in value entity compares the historic value histogram on a per-attribute basis against the entity. An embodiment may then calculate a divergence score of an attribute, which is inversely proportional to the healthy state occurrence probability determined herein. The entity would then be assigned the maximum divergence score of any associated attribute. Referring to FIGS. 10A and 10B, once the scores are assigned to each entity, an embodiment may strengthen or weaken the seed-anomaly scores based on dependency edges. As each entity is strengthened or weakened, the root causes begin to sort by score, thus creating a ranked list of root causes. Due to the fact that the scores strengthening and weakening depend on dependencies, an entity that is heavily dependent upon a large number of other entities will receive a high score. For example, in FIG. 10A, an embodiment illustrates a Storage Area Network (SAN) disk entity. Thus, because a SAN disk affects a great many other entitles (e.g., all disk I/O heavy process entities that access or read from it) it has its seed-anomaly score strengthened.

Additionally or alternatively, a seed-anomaly score may become weaker with each cycle. By way of example, and referring now to FIG. 10B, an embodiment may weaken the seed score if an application process (e.g., P0) fails or behaves improperly. P0 may be in remote communication with P1 and P2, wherein one of P1 and P2 is the root cause. Thus, the dependencies of P1 and P2 are analyzed, and it is determined that P3 at 1010 and P4 and 1020, both of which P1 depends on are in a healthy state (e.g., operating correctly). However, when analyzing P2, it is determined that P5 at 1030 which P2 depends on is misbehaving. In the foregoing embodiment, P1 gets a weakened score, because P3 and P4 are in proper condition, and thus less likely to be identified as the root cause of the failure.

An iterative graph convergence algorithm may then be run that propagates the seed-anomaly scores or updated scores from the previous iteration along the dependency edges. Based on this algorithm, nodes having the highest weight after multiple iteration rounds are likely to be identified as root cause candidates at 160. The root cause candidates are typically associated with an entity within the networked distributed system/application (e.g., integrated network system, operating system, application, virtual machine, hardware component, etc.) A further embodiment utilizes an iterative graph algorithm (similar to a web page ranking algorithm) that converges the final weights of the graph nodes, thus indicating the probability of a particular feature being the root cause of the identified problem. Thereby, creating a cause probability for each root cause candidate. A further embodiment of root cause identification is shown at 240.

Figure 11:
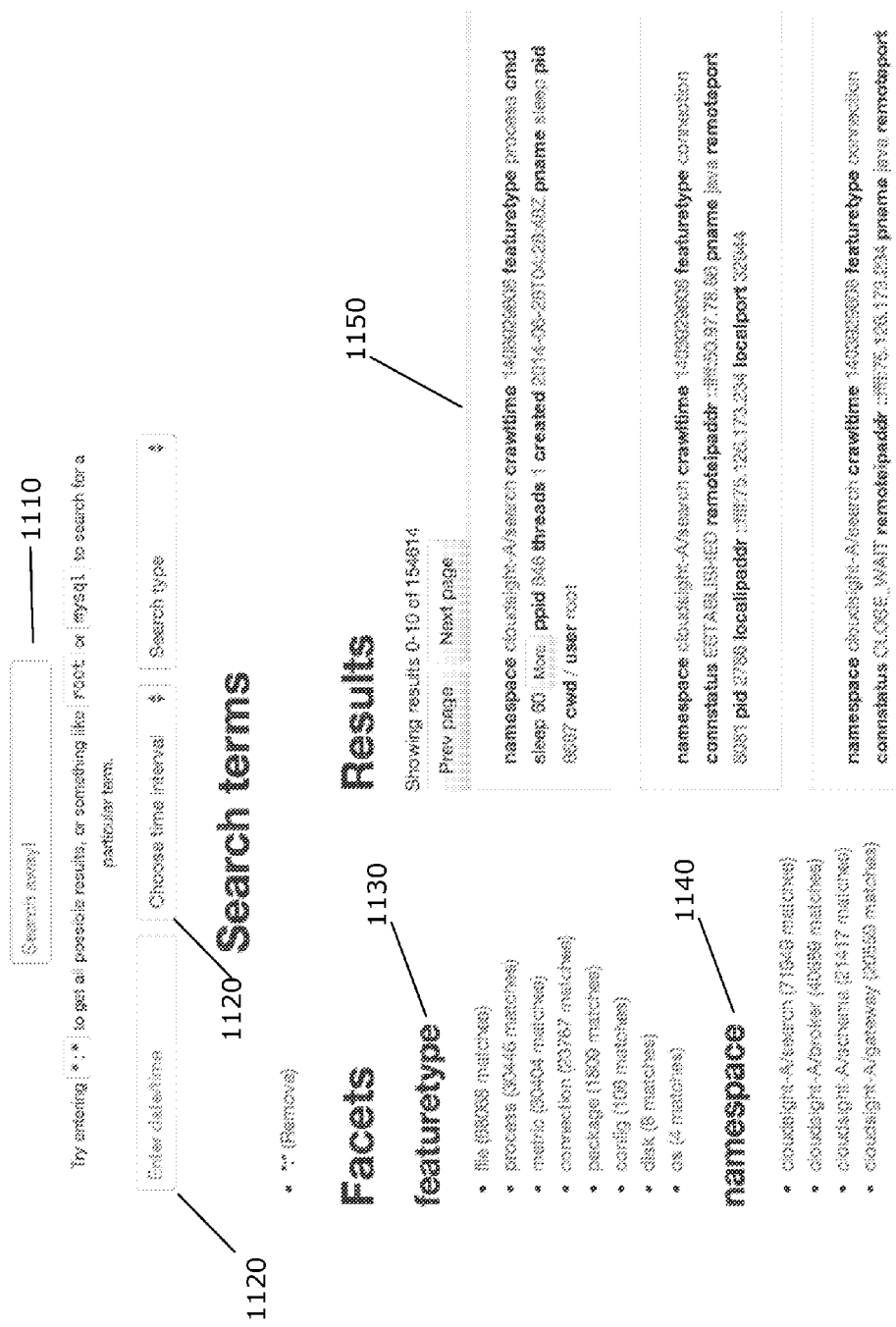
FIG. 11 illustrates an example graphical user interface for a root cause search application.

Once the probability score is generated for each root cause candidate, they are ranked and displayed to the user at 170 via a graphical user interface (GUI). An example GUI is shown in FIG. 11. Referring now to FIG. 11, an embodiment may display the ranked results and allow for faceted graph navigation. For example, an embodiment may allow a user to search at 1110 using a particular term like root or mysql. Additionally, an embodiment may allow a user to select a specific time or time interval range for the search function at 1120.

Prior to or directly after a search has been carried out, an embodiment may allow a user may narrow the search based on various facets, for example, the featuretypes at 1130. Additionally or alternately, the user may further narrow the search based on facets of the namespace at 1140. The featuretypes and namespace variables are further discussed herein with respect to FIG. 3. Once all search requirements are entered at 1110, and all desired refinements are selected at 1120-1140, the search results are displayed at 1150. An embodiment may include within the search results a summary of the root cause entity (e.g., namespace, crawltime, featuretype, etc.)

Thus as described herein, FIG. 12 identifies the technical improvement to the existing method of identifying a root cause as done by IT administrators currently. For example, typically, there are three types of data: metric, log, and fine grained machine state data get examined. The typical drill down approach is to use metric data to detect service level agreement (SLA) violations on and thereby identify the faulty application component. Then utilizing the information attained from the metric data, the log data parsed to identify errors or warnings messages thus identifying faulty application components. However, the granularity at which metric and log data can pinpoint the cause of the fault fails short of what is needed in the field. Consequently, the clues offered by metric and log data then used by the IT admin to manually analyze the fine grained machine state entities (processes, configuration files, packages, connections, mounted disk partitions, file system metadata, etc.) that might be related to the observed errors and warning messages. Thus an embodiment, presents a technical advantage over the aforementioned process by automatically analyzing fine grained machine state data and reporting detected anomalies.

Figure 13:
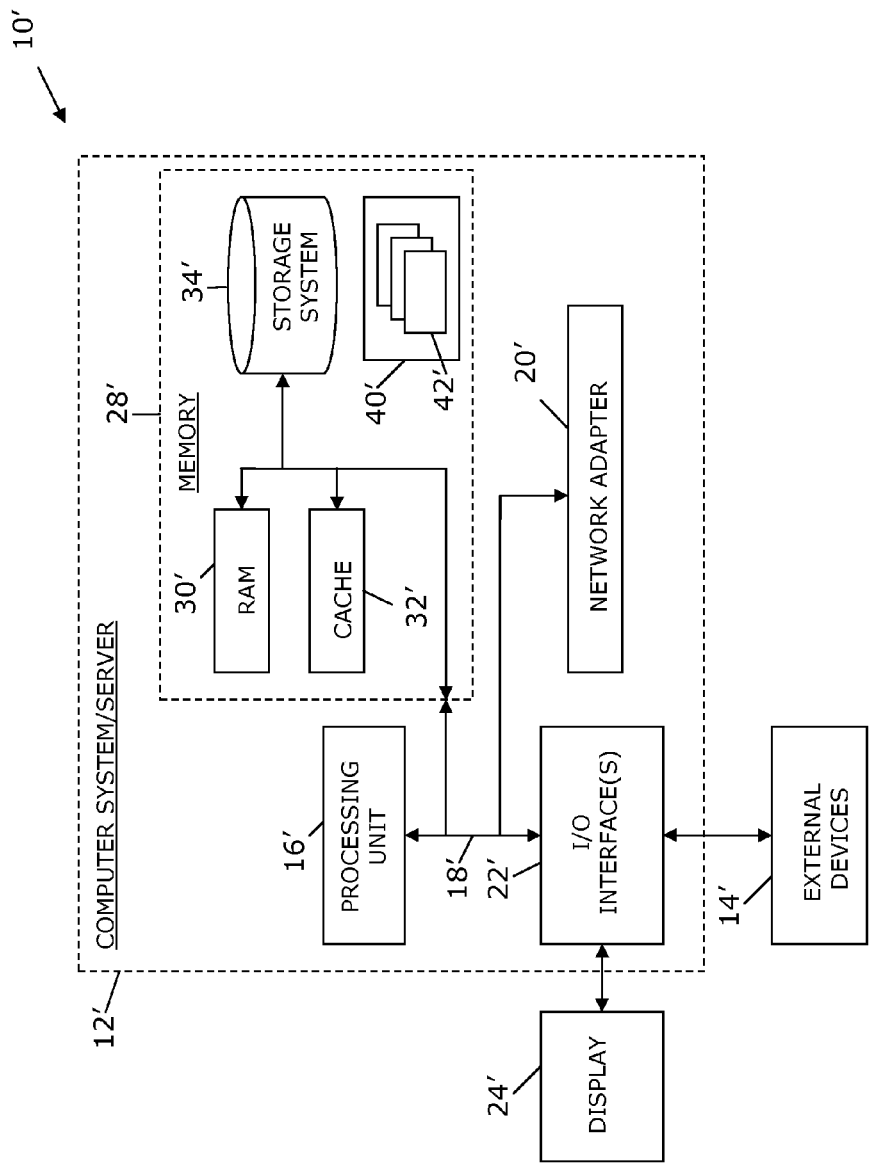
FIG. 13 illustrates an example computer system.

Referring now to FIG. 13, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand alone node.

In computing node 10' there is a computer system/server 12', which is operational with numerous other general purpose or special purpose computing system environments or configurations. Examples of well known computing systems, environments, and/or configurations that may be suitable for use with computer system/server 12' include, but are not limited to, personal computer systems, server computer systems, thin clients, thick clients, hand held or laptop devices, multiprocessor systems, microprocessor based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12' in computing node 10' is shown in the form of a general purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying root causes of system failures in a distributed system, said method comprising:
   utilizing at least one processor to execute computer code that performs the steps of:
   recording, in a storage device, collected machine state data, wherein the collected machine state data are added to historical machine state data;

creating, based on the historical machine state data, a healthy map model;
detecting at least one failed machine state in the distributed system;
comparing the failed machine state against the healthy map model;
identifying, based on the comparison, at least one root cause of the failed machine state; and
displaying, on a display device, a ranked list comprising the at least one root cause.

2. The method according to claim 1, wherein the machine state data comprise at least one of: a process, a connection, a configuration setting, an application metric, a resource attribute, a disk attribute, a processor attribute, and a memory attribute.

3. The method according to claim 1, wherein the machine state data is collected at predetermined intervals; and the historical machine state data are updated when the machine state data is collected.

4. The method according to claim 1, further comprising:
identifying dependencies between interconnected entities within the distributed system; and
creating a property graph representation based on the identified dependencies.

5. The method according to claim 4, further comprising creating the healthy map model by aggregating a plurality of property graph representations, wherein each property graph relates to a particular snapshot of machine state data.

6. The method according to claim 4, further comprising:
determining a failure time, wherein the failure time is associated with a machine state failure; and
determining a healthy time, wherein the healthy time is associated with a healthy state of the machine state and its dependencies prior to the failure time.

7. The method according to claim 6, further comprising:
categorizing the machine state data collected between the healthy time and the failure time;
wherein the categorizing comprises determining if a machine state is at least one of new, missing, changed, and unchanged.

8. The method according to claim 7, further comprising generating at least one seed-anomaly score, using an inference algorithm for machine states within the categorized machine state data.

9. The method according to claim 8, further comprising modifying the at least one seed-anomaly score, based on an iterative graph convergence algorithm;
wherein the ranked list is based on the modified at least one seed-anomaly score.

10. An apparatus for identifying root causes of system failures in a distributed system apparatus comprising:
at least one processor; and
a computer readable storage medium having computer readable program code embodied therewith and executable by the at least one processor, the computer readable program code comprising:
computer readable program code that records, in a storage device, collected machine state data, wherein the collected machine state data are added to historical machine state data;
computer readable program code that creates, based on the historical machine state data, a healthy map model;
computer readable program code that detects at least one failed machine state in the distributed system;
computer readable program code that compares the failed machine state against the healthy map model;
computer readable program code that identifies, based on the comparison, at least one root cause of the failed machine state; and
computer readable program code that displays, on a display device, a ranked list comprising the at least one root cause.

11. A computer program product for identifying root causes of system failures in a distributed system, said computer program product comprising:
a non-transitory computer readable storage medium having computer readable program code embodied therewith, the computer readable program code comprising:
computer readable program code that records, in a storage device, collected machine state data, wherein the collected machine state data are added to historical machine state data;
computer readable program code that creates, based on the historical machine state data, a healthy map model;
computer readable program code that detects at least one failed machine state in the distributed system;
computer readable program code that compares the failed machine state against the healthy map model;
computer readable program code that identifies, based on the comparison, at least one root cause of the failed machine state; and
computer readable program code that displays, on a display device, a ranked list comprising the at least one root cause.

12. The computer program product according to claim 11, wherein the machine state data comprise at least one of: a process, a connection, a configuration setting, an application metric, a resource attribute, a disk attribute, a processor attribute, and a memory attribute.

13. The computer program product according to claim 11, wherein the machine state data is collected at predetermined intervals; and the historical machine state data are updated when the machine state data is collected.

14. The computer program product according to claim 11, wherein the computer readable program code comprises:
computer readable program code that identifies dependencies between interconnected entities within the distributed system; and
creates a property graph representation based on the identified dependencies.

15. The computer program product according to claim 14, wherein the computer readable program code comprises:
computer readable program code that creates the healthy map model by aggregating a plurality of property graph representations, wherein each property graph relates to a particular snapshot of machine state data.

16. The computer program product according to claim 15, wherein the computer readable program code comprises:
computer readable program code that determines a failure time, wherein the failure time is associated with a machine state failure; and
determines a healthy time, wherein the healthy time is associated with a healthy state of the machine state and its dependencies prior to the failure time.

17. The computer program product according to claim 16, wherein the computer readable program code comprises:
computer readable program code that categorizes the machine state data collected between the healthy time and the failure time;
wherein the categorizing comprises determining if a machine state is at least one of new, missing, changed, and unchanged.

18. The computer program product according to claim 17, wherein the computer readable program code comprises: computer readable program code that generates at least one seed-anomaly score, using an inference algorithm for machine states within the categorized machine state data.

19. The computer program product according to claim 18, wherein the computer readable program code comprises: computer readable program code that modifies the at least one seed-anomaly score, based on an iterative graph convergence algorithm;
  wherein the ranked list is based on the modified at least one seed-anomaly score.

20. A method comprising:
  recording, in a storage device, collected machine state data, wherein the collected machine state data are added to historical machine state data;
  creating, based on the historical machine state data, a healthy map model;
  detecting at least one failed machine state in the distributed system;
  determining a failure time, wherein the failure time is associated with the at least one machine state failure;
  determining a healthy time, wherein the healthy time is associated with a healthy state of the machine state and its dependencies prior to the failure time;
  generating at least one seed-anomaly score, using an inference algorithm, for machine states between the healthy time and the failure time; and
  modifying the at least one seed-anomaly score, based on an iterative graph convergence algorithm;
  generating a ranked list of root causes of the at least one failed machine state, wherein the ranked list is based on the modified at least one seed-anomaly score.

* * * * *